United States Patent [19]
Posch

[11] Patent Number: 5,724,270
[45] Date of Patent: Mar. 3, 1998

[54] WAVE-NUMBER-FREQUENCY ADAPTIVE BEAMFORMING

[75] Inventor: Theodore E. Posch, deceased, late of Fullerton, Calif., by Theodore E. Posch, executor

[73] Assignee: HE Holdings, Inc., Los Angeles, Calif.

[21] Appl. No.: 703,235

[22] Filed: Aug. 26, 1996

[51] Int. Cl.$^6$ ............................................. G06F 15/31
[52] U.S. Cl. .......................... 364/576; 364/725; 364/726; 367/119
[58] Field of Search ................... 364/576, 715.01, 364/725, 726; 367/99, 101–103, 119, 121, 124; 342/195, 196, 368, 373, 378, 192, 354

[56] References Cited

U.S. PATENT DOCUMENTS

| | | | |
|---|---|---|---|
| 4,112,430 | 9/1978 | Ladstatter | 343/100 R |
| 4,212,084 | 7/1980 | Poole | 367/118 |
| 4,231,103 | 10/1980 | Timm | 364/726 |
| 4,245,333 | 1/1981 | Jelks | 367/121 |
| 4,559,605 | 12/1985 | Norsworthy | 364/726 |
| 4,750,147 | 6/1988 | Roy, III et al. | 364/807 |
| 5,014,250 | 5/1991 | Hadderingh | 367/124 |
| 5,168,472 | 12/1992 | Lockwood | 367/119 |
| 5,495,256 | 2/1996 | Piper | 342/195 |
| 5,510,799 | 4/1996 | Wishart | 342/373 |

OTHER PUBLICATIONS

"Formation of the maximum signal–to–noise ratio array processor in beam space," D.A. Gray, *J. Acoust. Soc. Am.*, vol. 72, pp. 1195–1201, 1982.

"Output Statistics of the Sample Matrix Inverse Beamformer Implemented In Beam Space," D.A. Gray, *J. Acoust. Soc. Am.*, vol. 80(6), pp. 1737–1739, 1986.

"Theoretical and Experimental Comparisons of the Formation of Optimum Processors in Element, Beam and Eigen Space," D.A. Gray, Proc. NATO Conf., Adaptive Methods in Underwater Acoustics, Luneberg 1984, Ed. H.G. Urban and D. Reidel.

*Primary Examiner*—Emanuel T. Voeltz
*Assistant Examiner*—Bryan Bui
*Attorney, Agent, or Firm*—G. S. Grunebach; M. W. Sales; W. K. Denson-Low

[57] ABSTRACT

Wave-number-frequency adaptive beamforming using a reduced rank k–ω matrix method. A spatial Fourier transform of the narrowband receiver outputs for the sensors in a linear array is taken to enter the wave number space and generate M independent spatial wave number beams w. The spatial FFT outputs are used to form the entries in a matrix of eigenvectors, wherein the k-th eigenvector represents a set of spatial convolution coefficients. The spatial wave number beams are weighted in an adaptation process by the spatial convolution coefficients to form a beam steered in the direction of a k-th signal source.

11 Claims, 3 Drawing Sheets

WAVE-NUMBER-FREQUENCY ADAPTIVE BEAMFORMING

TECHNICAL FIELD OF THE INVENTION

This invention relates generally to sensor array signal processing, and more particularly to the process of adaptive beamforming using a reduced rank k–ω matrix approach.

BACKGROUND OF THE INVENTION

For linear arrays of hydrophones, frequency domain beamforming is often used so that the efficiency of the Fast Fourier Transform (FFT) can be applied to both the spectral and spatial data. At half wavelength hydrophone spacing, i.e., the design frequency of the array, the number of beams formed is, in most cases, equal to the number of sensors in the array.

Techniques for implementing adaptive beamforming in beam space using the cross spectral density matrix (CSDM) of the narrowband beam outputs are described by D. A. Gray, "Formation of the maximum signal-to-noise ratio array processor in beam space," *J. Acoust. Soc. Am.*, Vol. 72, pp. 1195–1201, 1982, and "Output Statistics of the Sample Matrix Inverse Beamformer Implemented in Beam Space," *J. Acoust. Soc. Am.*, Vol. 80(6), pp. 1737–1739, 1986; testing is described in D. A. Gray, "Theoretical and Experimental Comparisons of the Formation of Optimum Processors in Element, Beam and Eigen Space," Proc. NATO Conf., "Adaptive Methods in Underwater Acoustics," Luneberg 1984, Editors H. G. Urban and D. Reidel. A disadvantage of the beamforming described in these references, which are hereinafter sometimes referred to as "Gray", is the need for a full beam set, i.e. there is no reduction in the number of beams as the frequency is reduced below the design frequency.

SUMMARY OF THE INVENTION

A feature of this invention is that, for frequencies below half wavelength sensor spacings, a reduced number of beams, overlapping at their 3 dB points, can be used, which will ensure that the angular coverage of interest is still fully covered. Such a beam set is produced by a spatial FFT in the case of a uniformly spaced array of elements. The output of a spatial FFT is the wave number distribution of the arriving energy. Below the design frequency, not all of the wave number (spatial FFT) outputs correspond to waves arriving in space. Only the reduced number of wave number outputs which do correspond to waves arriving in space need be retained.

A method is described for wave-number-frequency adaptive beamforming using a linear array of M sensors. The method includes the following steps:

performing a spectral Fast Fourier Transform (FFT) on time samples of the sensor outputs for each sensor to produce frequency bin outputs;

performing a spatial FFT across the sensors at a given frequency bin to enter the wave number space and generate $N_W$ (less than or equal to M) independent spatial wave number beams;

forming a cross-covariance matrix from the spatial wave number beams;

performing an eigenvalue decomposition of the cross-covariance matrix to determine a set of eigenvectors; and applying the set of eigenvectors as weights to the spatial wave number beams to form output beams.

According to another aspect of the invention, the method can include the steps of splitting the physical region of wave number space into a number of smaller sub-regions, each with a predetermined number of independent wave number bins. The cross-covariance matrix is then formed only over the wave numbers in the smaller sub-regions.

When the spacing between sensors is equal to one half wavelength at a given operating frequency, the number of beams M at the operating frequency is selected to be on the order of the number of dominant interferers. At all other operating frequencies at which beams are formed, if the frequency is lower than the design frequency, the number of beams $N_W$ is selected to be less than the number of sensors (M). When the operating frequency is selected such that the sensor spacing is equal to one quarter wavelength or less, for example, only one half or less of the spatial FFT outputs need be used.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
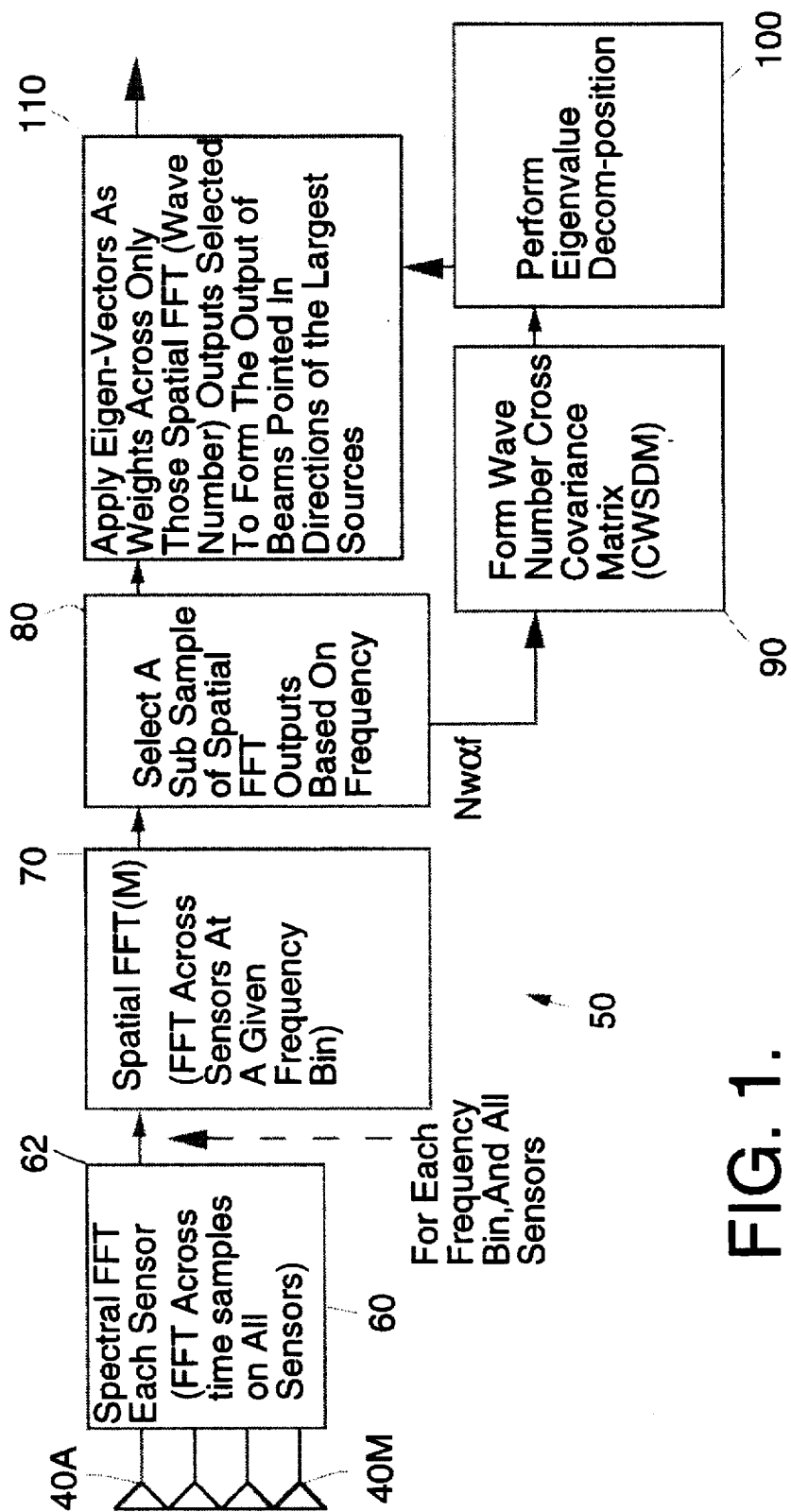
FIG. 1 is a functional block diagram of a sensor array system in accordance with this invention.

FIG. 1 is a simplified functional block diagram of a processor system 50 embodying this invention. The processor receives and processes the signals from M sensors 40A–40M. In this exemplary embodiment, the sensors form a linear array of equally spaced elements. The processor initially performs at function 60 a spectral Fast Fourier Transform (FFT) operation on the time samples of the signals received from each sensor. When an FFT is performed across time samples, the output is a set of bins each representing the contents at a particular frequency. These bins are generally referred to as frequency bins. FIG. 1 shows the operations performed for an exemplary frequency bin 62. The operations 70–110 are all performed over all the frequency bins in the frequency band of interest.

The next operation performed on the exemplary frequency bin is a spatial FFT (function 70). A spatial FFT is an FFT performed at a given bin across all of the sensors 40A–40M which are spread in space. The result is a decomposition of the received energy into bins called wave number bins, where the wave number k=sinθ/λ, and θ is measured from broadside.

The next operation (function 80) is to select a sub sample of spatial FFT outputs based on frequency. The sub sample will be $N_W$ FFT outputs. A wave number cross covariance matrix (CWSDM) is formed (function 90) on the sub sample of FFT spatial outputs. A CWSDM at a given frequency bin is a matrix whose k,l entry is the time average of the kth wave number bin output multiplied by the complex conjugate of the lth wave number bin output, each at the specified frequency bin. An eigenvalue decomposition of the CWSDM is performed (function 100). The eigenvectors of the CWSDM are applied (function 110) as weights across the spatial FFT sub sample of $N_W$ spatial FFT outputs to form outputs of beams pointed in the directions of the largest energy sources.

Figure 2:
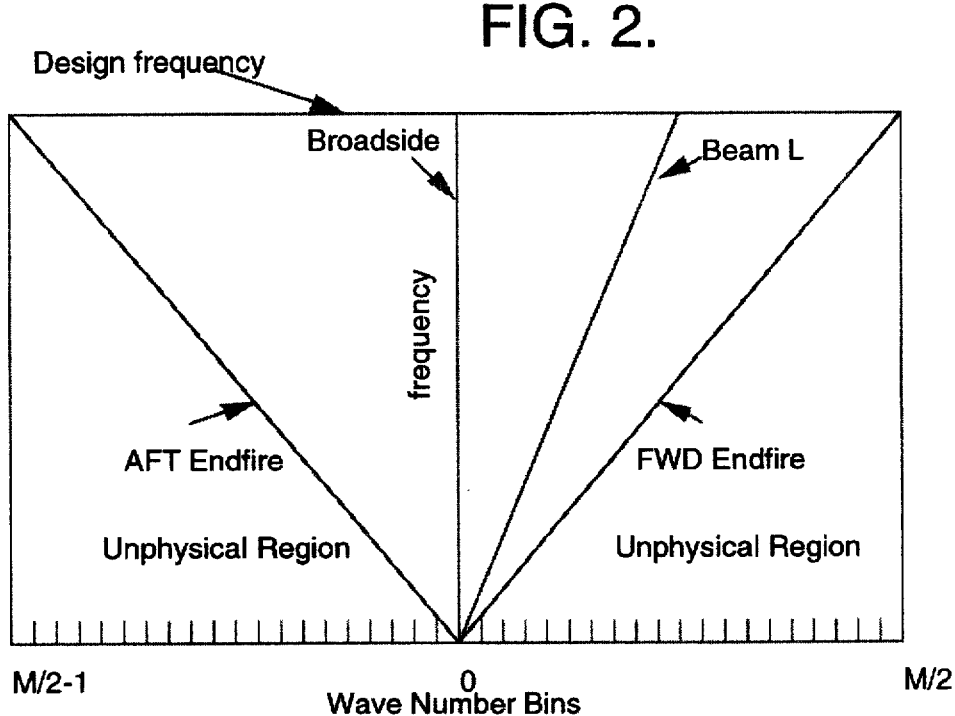
FIG. 2 is a plot of frequency versus wave number at the output of the spatial FFT.

At half wavelength sensor spacing, i.e., the design frequency of the array 40, the number of beams formed is, in most cases, equal to the number of sensors in the array. This is illustrated in FIG. 2, which is a graph of the wave number bins, from $M/2-1$ to $M/2$, as a function of frequency from 0 to the design frequency (one half wavelength spacing). However, for frequencies below half wavelength, a reduced number of beams, overlapping at their 3 dB points, can be used in accordance with this invention, which will ensure that the angular coverage of interest is still fully covered. Below the design frequency, not all of the wave number (spatial FFT) outputs correspond to waves arriving in space. These wave number outputs fall in the unphysical regions indicated in FIG. 2. Only the reduced number of wave number outputs which do correspond to waves arriving in space need be retained. These wave number outputs fall between the aft endfire beam and the forward (FWD) endfire beams shown in FIG. 2. The zero wave number bin corresponds to the broadside beam. In general, a beam between the forward and the aft endfire beams is shown in FIG. 2 as beam L.

The frequency domain element space power estimate, in the direction defined by k, is given by:

$$\hat{p}_x(k,f) = [v^H(k,f) \hat{R}_x^{-1}(f) v(k,f)] \quad (1)$$

where $v(k,f)$ is the steering vector of phases, whose components are given by $e^{(j2\pi k \cdot x_i)}$, where $x_k$ is the position of the kth receiver and k is the wave vector defined by $$k = \left(\frac{1}{\lambda}\right) [(\cos\theta\sin\phi),(\sin\theta\sin\phi),(\cos\theta)] \quad (2)$$

Thus, $(\theta,\phi)$ is the direction defined by k.

The estimated cross-spectral density matrix of the receiver outputs is given by $$\hat{R}_x(f) = \left(\frac{1}{K}\right) \sum_{n=1}^{K} X_n(f) X_n^H(f) \quad (3)$$

where K is the number of elements and $X_n$ is the K-vector of complex receiver outputs at frequency f obtained by spectral Fourier transforming the nth block of data from each receiver. This estimate of the power is referred to as the element space sample matrix inverse (SMI) beamformer since it uses the outputs of the receiver elements.

The frequency domain beam space estimator is given as $$\hat{p}_y(k,f) = [S^H(k,f) \hat{R}_y^{-1}(f) s(k,f)]^{-1} \quad (4)$$

where the estimated cross-spectral density matrix of the M conventional beams is given by $$\hat{R}_y(f) = \frac{1}{N} \sum_{n=1}^{N} Y_n(f) Y_n^H(f) \quad (5)$$

where $Y_n(f)$ is the M-vector of complex beam outputs at frequency f, obtained by spectral Fourier transforming the nth block of data from each beam. In the absence of implementation errors, $$\hat{R}_y(f) = V^H(f) \hat{R}_x(f) V(f) \quad (6)$$

The K×M matrix V(f) has columns of the form $v(k_m,f)$ where $v(k_m,f)$ is the set of steering vectors of phases whose components are determined by the direction of the mth conventional beam used in the beam space algorithm, i.e.

$$V(f) = [v(k_1,f), v(k_2,f), \ldots, v(k_m,f)] \quad (7)$$

Note that each column of V can be interpreted in terms of the beam pattern of the array for each of the steering directions. The beam space steering vector s(k,f) is given as $$s(k,f) = V^H(f) v(k,f). \quad (8)$$

for the case when $s((k,f)$ steers a beam in a common direction as $v(k,f)$. Dropping the explicit frequency dependence, V can be written as $$V = [v(k_1), v(k_2), \ldots, v(k_M)] \quad (9)$$

where for a linear array of equally-spaced sensors located along the z-axis where $x_k = [0,0,(k-1)d]$, it can be readily shown that $$(v(k_m))_k = e^{j2\pi(k-1)d\sin\theta_m/\lambda} = (u_m)^{k-1} \quad (10)$$

where $$u_m = e^{j2\pi d k_m} \quad (11)$$

and $$k_m = \sin\theta_m / \lambda \quad (12)$$

In matrix form, V is given by $$V = \begin{bmatrix} 1 & 1 & \ldots & 1 \\ u_1 & u_2 & \ldots & u_M \\ u_1^2 & u_2^2 & \ldots & u_M^2 \\ \cdot & \cdot & & \cdot \\ \cdot & \cdot & & \cdot \\ \cdot & \cdot & & \cdot \\ u_1^{K-1} & u_2^{K-1} & \ldots & u_M^{K-1} \end{bmatrix} \quad (13)$$

In contrast to the beam space approach just described, the wave number space is entered by taking a spatial Fourier transform of the narrowband receiver outputs from the spectral FFT 60 (FIG. 1). In practice, the spatial FFT size M is often chosen to be equal to the number of elements in the linear array, and is used to generate the M independent wave number beams, denoted by the vector w. It can readily be shown that these are related to the receiver outputs by an equation of the form $$w = Ux \quad (14)$$

where U is the matrix of the spatial FFT, i.e.

$$U_{nm} = e^{-j2\pi nm/k}; \; n,m=0,\ldots,K-1 \quad (15)$$

U is given by the following $$\begin{bmatrix} e^{-j\pi(\frac{N-1}{N})(m_1-\omega_1 D)}\dfrac{\sin\pi(m_1-\omega_1 D)}{N\sin\frac{\pi}{N}(m_1-\omega_1 D)} & \cdots & e^{-j\pi(N-\frac{1}{N})(m_1-\omega_N D)}\dfrac{\sin\pi(m_1-\omega_N D)}{N\sin\frac{\pi}{N}(m_1-\omega_N D)} \\ e^{-j\pi(N-1\frac{1}{N})(m_2-\omega_1 D)}\dfrac{\sin\pi(m_2-\omega_1 D)}{N\sin\frac{\pi}{N}(m_2-\omega_1 D)} & \cdots & \cdots \\ e^{j\pi(N-1\frac{1}{N})(m_n-\omega_1 D)}\dfrac{\sin\pi(m_n-\omega_1 D)}{N\sin\frac{\pi}{N}(\omega_1 D)} & \cdots & e^{-j\pi(N-1\frac{1}{N})(m_n-\omega_N D)}\dfrac{\sin\pi(m_n-\omega_N D)}{N\sin\frac{\pi}{N}(m_n-\omega_N D)} \end{bmatrix}$$

Furthermore, the cross wave number spectral density matrix (CWSDM) may be expressed as $$\hat{R}_x(f)=U^H \hat{R}_x(f) U \qquad (17)$$

This CWSDM is the matrix whose eigen vectors and eigen values are determined in the function 100 illustrated in FIG. 1.

The spatial FFT operation 70 is given as $$V_{m,k} = \sum_{n=0}^{N-1} A_{k,n} e^{-j2\pi\frac{nm}{N}}; m=0,1,\ldots N-1 \qquad (18)$$

where $U_{mn}$ is the $m^{th}$ spatial FFT output, n is the sensor index, and N is the number of sensors in the array. $A_{k,n}$ is the response of each sensor 40A–40M to plane waves arriving from the various directions $\theta_k$. The k-th eigenvector of the CWSDM represents the set of spatial convolution coefficients weighting the spatial wave number FFT beams at function 110 (FIG. 1) to form a beam steered in the direction of the k-th signal source.

The approach adopted by Gray was to use beams uniformly spread over the whole acoustic region to estimate the optimum weights. These weights were then applied to all the beams and a modified steering vector was used to estimate the incident power distribution over the whole angular region. A heuristic, dimension reducing, rule of thumb was to choose the number of beams by dividing the angular region by the beamwidth. The beam's directions can easily be obtained by oversampling the beams at their nominal 3 dB points.

Figure 3:
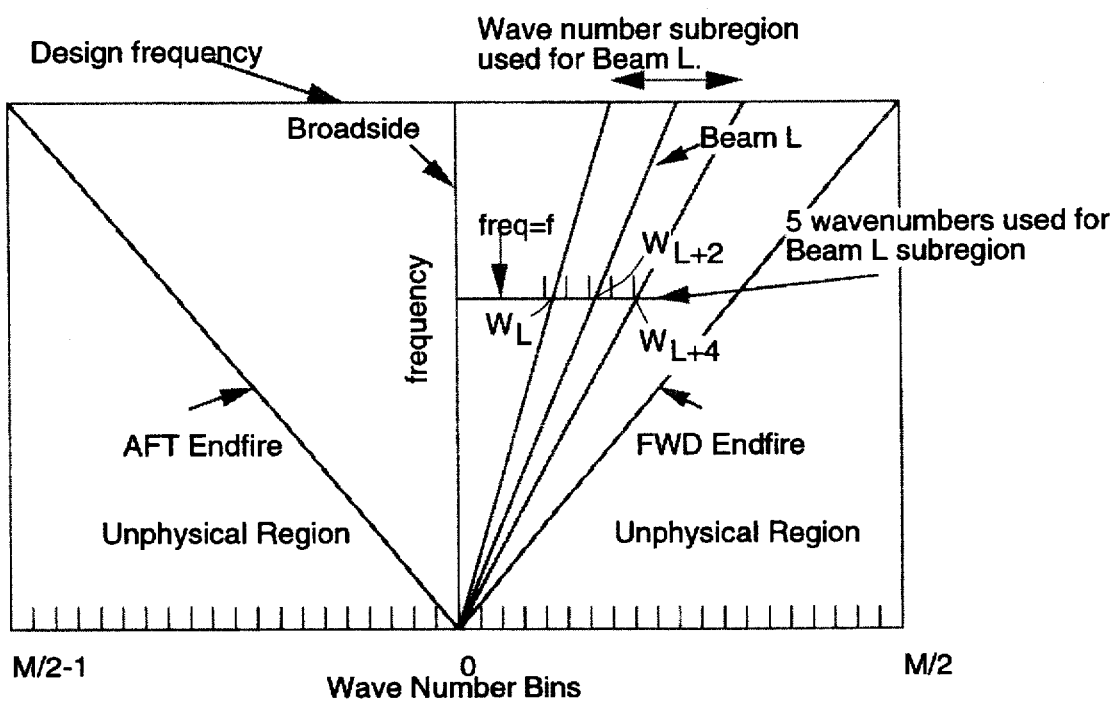
FIG. 3 is a plot of frequency versus wave number, illustrating the use of sub-regions of wave numbers.

The approach in accordance with this invention is to split the physical region of wave number space into a number of smaller sub-regions each with the order of 5 or, sometimes, 7, independent wave number bins in each sub-region. This spacing is illustrated in FIG. 3, which plots the wave number bins as a function of frequency as in FIG. 2, but further shows 5 wave numbers $w_L \ldots w_{L+4}$ selected for the beam L subregion at frequency f. Here, the middle wave number $w_{L+2}$ is centered on the beam L, with the remaining 4 wave number bins straddling beam L. In some applications, it may be advantageous to use more or less wave number bins, such as 7 bins.

Figure 4:
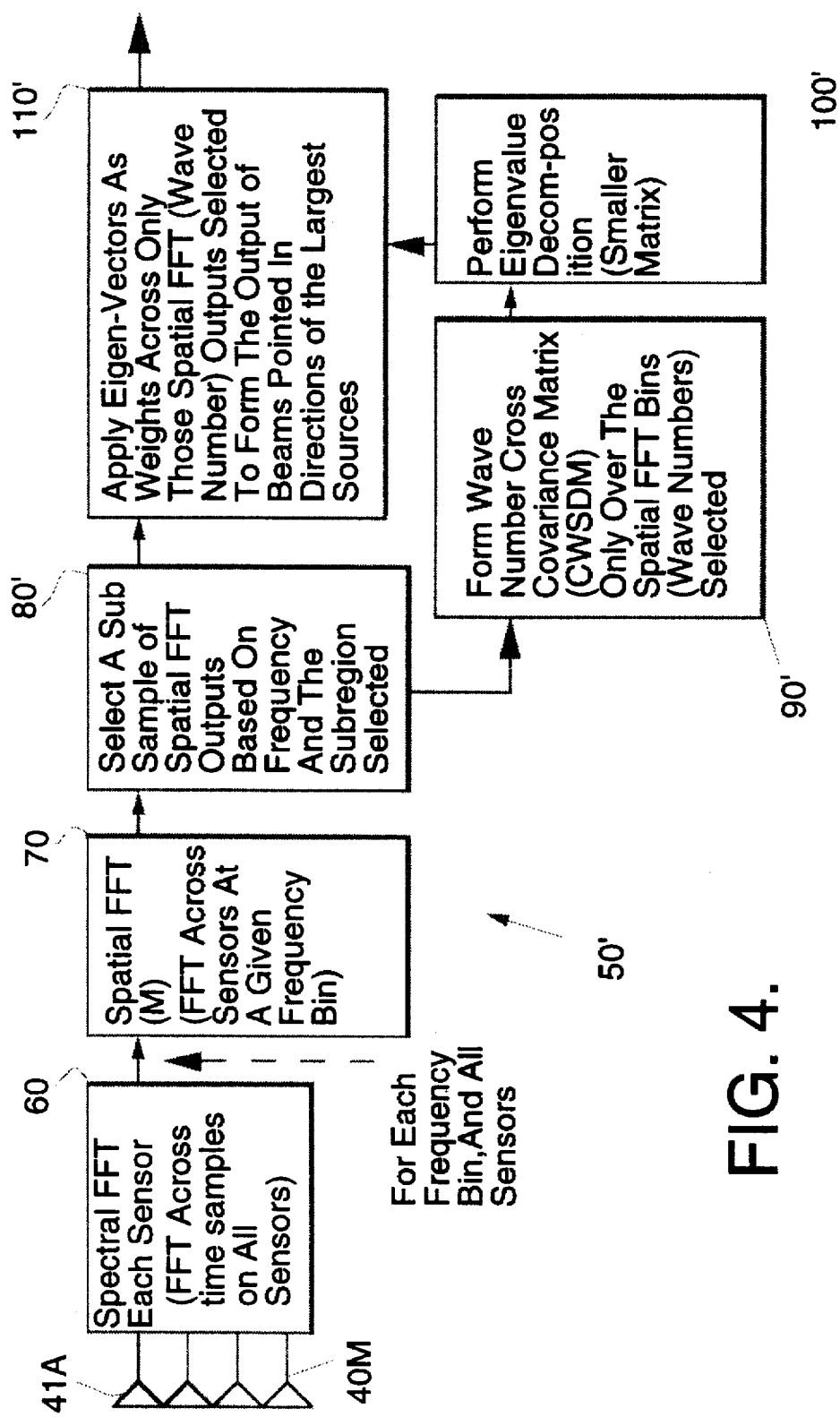
FIG. 4 is a functional block diagram of an alternate embodiment of a sensor array system embodying this invention.

FIG. 4 is a functional block diagram of an alternate embodiment of a processor 50' in accordance with the invention, wherein the physical region of wave number space is split into a number of smaller sub-regions. The processor 50' is very similar to the processor 50. However, the function 80' selects a sub sample of spatial FFT outputs based not only on frequency, as in processor 50, but also based on the subregion selected. For the example of FIG. 3, the frequency selected is f, and the subregion selected includes the wave number bins $w_L \ldots w_{L+4}$, with beam L at the center of the subregion. Function 90' forms the CWSDM only over the spatial FFT bins selected. This CWSDM is a smaller matrix, on which the eigenvalue decomposition 100' function is performed. The eigenvectors resulting from the decomposition function are applied in function 110' as weights across only those spatial FFT wave number outputs selected to form the output of beams pointed in directions of the largest sources. This embodiment differs from that of FIG. 1 in that only a sub region of wave numbers is selected, rather than all wave numbers spanning forward to aft endfire.

The independent wave number bins whose responses cover the region in question are used to estimate the optimum weights within a subregion, as shown by function 100' in FIG. 4. The location of beam L may by known based on prior information available to the processor. Alternatively, a plurality of subregions may be defined to cover a region or regions of interest.

The computation complexity of the beam space technique of Gray is of the order of $O(M^3)$, and that of the wave-number space technique in accordance with the invention is of the order of $O(5^3)$. At the half wavelength frequency of the array, a sufficient number of beams is naturally achieved by selecting M beams, where M is the number of sensors, which overlap at their nominal 3 dB points. In this case, the technique of Gray, designed for covering the whole angular region, is not dimension reducing since the number of beams equals the number of sensor elements. However, the method in accordance with the invention is dimension reducing since at the design frequency the number of beams used in the adaptation process or the number of wave numbers is on the order of dominant interferers, or usually restricted to about 5 (or sometimes 7). Even for the case of a single interferer that has some spatial extent, it is prudent to select a matrix of the size of 5 or more entries.

Below half-wavelength, however, the situation is quite different. Since the angular domain is a subset of the wave number domain, the two approaches are in general different and are only equivalent provided the wave number steering directions are restricted to the physical region and are chosen to be the same as the angular steering directions. Also, by choosing K, the number of beams to be adapted, to be less than M, the number of elements, both methods are dimension reducing. A reduced dimension approach can, for a small number of interferers, achieve approximately the same gains as the full rank element space approach with a decreased variance in power estimates.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for wave-number-frequency adaptive beam forming using the sensor outputs from a linear array of sensors, comprising the following steps:

performing a spectral Fast Fourier Transform (FFT) on time samples of the sensor outputs for each sensor to produce frequency bin outputs;

performing a spatial FFT across the sensors at a given frequency bin to enter the wave number space and generate Nw independent spatial wave number beams;

selecting a subsample of spatial FFT outputs based on frequency and then selecting a subsample of spatial FFT outputs based on frequency and then forming a cross-covariance matrix from the spatial wave number beams;

performing an eigenvalue decomposition of the cross-covariance matrix to determine a set of eigenvectors; and applying the set of eigenvectors as weights to the spatial wave number beams to form output beams.

2. The method of claim 1 wherein the spacing between sensors is equal to one half wavelength at a first operating frequency, and wherein said beams are formed at a second operating frequency lower than said first operating frequency, and the number of beams $N_W$ is selected to be less than the number of sensors.

3. A method for wave-number-frequency adaptive beamforming using the sensor outputs from a linear array of sensors, comprising the following steps:

performing a spectral Fast Fourier Transform (FFT) on time samples of the sensor outputs for each sensor to produce frequency bin outputs;

performing a spatial FFT across the sensors at a given frequency bin to enter the wave number space and generate a plurality of independent spatial wave number beams;

selecting a subset of the wave number outputs based on the frequency bin and a wave number subregion;

forming a cross-covariance matrix from the subset of the wave number outputs;

performing an eigenvalue decomposition of the cross-covariance matrix to determine a set of eigenvectors; and applying the set of eigenvectors as weights to the selected subset of spatial wave number outputs to form output beams.

4. The method of claim 3 wherein the spacing between sensors is equal to one half wavelength at a first operating frequency, and wherein said output beams are formed at a second operating frequency lower than said first operating frequency, and the number of beams is selected to be less than the number of sensors.

5. A method for wave-number-frequency adaptive beamforming using a linear array of sensors, comprising the following steps:

providing narrowband receiver outputs for each sensor;

taking a spatial Fourier transform of the receiver outputs to enter the wave number space and generate M independent spatial wave number beams w;

using the spatial transform outputs to form the entries in a matrix of eigenvectors, wherein the k-th eigenvector represents a set of spatial convolution coefficients; and weighting the spatial wave number beams in an adaptation process to form a beam steered in the direction of a k-th signal source.

6. A processor for wave-number-frequency adaptive beamforming using the sensor outputs from a linear array of sensors, comprising:

a spectral Fast Fourier transformer for performing a Fast Fourier Transform (FFT) on time samples of the sensor outputs for each sensor to produce frequency bin outputs;

a spatial Fast Fourier transformer responsive to the frequency bin outputs for performing a spatial FFT across the sensors at a given frequency bin to enter the wave number space and generate a plurality of independent spatial wave number outputs;

means for selecting a subsample of spatial FFT outputs based on frequency and then forming cross wave number covariance matrix (CWSDM) from the spatial wave number outputs;

means for selecting a subsample of spatial FFT outputs based on frequency and then performing an eigenvalue decomposition of the CWSDM to determine a set of eigenvectors; and weighting means for applying the set of eigenvectors as weights to the spatial wave number outputs to form output beams pointed in the direction of the largest sources of energy received at the sensors.

7. The processor of claim 6 wherein the spacing between sensors is equal to one half wavelength at a first operating frequency, and wherein said wave number outputs are formed at a second operating frequency lower than said first operating frequency, and the number of wave number outputs is selected to be less than the number of sensors.

8. The processor of claim 6 further comprising means for selecting a subset of the wave number outputs covering only a sub-region of the wave number space extending between array forward endfire and aft endfire, and wherein the means for forming the CWSDM operates only on the subset of wave number outputs.

9. The processor of claim 8 wherein the subset of wave number outputs has only five outputs.

10. A method for wave-number-frequency adaptive beamforming using the sensor outputs from a linear array of sensors, comprising the following steps:

performing a spectral Fast Fourier Transform (FFT) on time samples of the sensor outputs for each sensor to produce frequency bin outputs;

performing a spatial FFT across the sensors at a given frequency bin to enter the wave number space and generate Nw independent spatial wave number beams;

selecting a subsample of spatial FFT outputs based on frequency and then selecting a subsample of spatial FFT outputs based on frequency and then forming a cross-covariance matrix from the spatial wave number beams;

performing an eigenvalue decomposition of the cross-covariance matrix to determine a set of eigenvectors; and applying the set of eigenvectors as weights to the spatial wave number beams to form output beams pointed in the directions of the largest sources of energy received at the sensors.

11. A method for wave-number-frequency adaptive beamforming using the sensor outputs from a linear array of sensors, comprising the following steps:

performing a spectral Fast Fourier Transform (FFT) on time samples of the sensor outputs for each sensor to produce frequency bin outputs;

performing a spatial FFT across the sensors at a given frequency bin to enter the wave number space and generate a plurality of independent spatial wave number beams;

selecting a subset of the wave number outputs based on the frequency bin and a wave number subregion, wherein the number of wave number outputs in the subset of spatial wave number outputs is five;

forming a cross-covariance matrix from the subset of the wave number outputs;

performing an eigenvalue decomposition of the cross-covariance matrix to determine a set of eigenvectors; and applying the set of eigenvectors as weights to the selected subset of spatial wave number outputs to form output beams.

* * * * *